United States Patent [19]

Adiletta

[11] Patent Number: 5,709,798
[45] Date of Patent: Jan. 20, 1998

[54] FIBROUS NONWOVEN WEB

[75] Inventor: Joseph G. Adiletta, Thompson, Conn.

[73] Assignee: Pall Corporation, East Hills, N.Y.

[21] Appl. No.: 492,420

[22] Filed: Jun. 19, 1995

[51] Int. Cl.$^6$ .................................................. B01D 61/00
[52] U.S. Cl. ...................... 210/651; 210/652; 210/654; 210/500.38; 210/506; 210/508; 210/509; 428/357; 428/395; 428/338
[58] Field of Search ............................... 210/651, 652, 210/654, 500.38, 506, 508, 509, 321.6; 428/357, 395, 338

[56] References Cited

U.S. PATENT DOCUMENTS

| | | |
|---|---|---|
| 3,242,035 | 3/1966 | White. |
| 3,756,908 | 9/1973 | Gross. |
| 4,340,479 | 7/1982 | Pall. |
| 4,369,156 | 1/1983 | Mathes et al.. |
| 4,523,995 | 6/1985 | Pall et al.. |
| 4,524,103 | 6/1985 | Seager. |
| 4,650,506 | 3/1987 | Barris et al.. |
| 5,246,776 | 9/1993 | Meraldi et al.. |
| 5,290,446 | 3/1994 | Degen et al.. |
| 5,529,844 | 6/1996 | Degen et al. ........................ 428/357 |

FOREIGN PATENT DOCUMENTS

| | | |
|---|---|---|
| 0 083 489 | 7/1983 | European Pat. Off.. |
| 0 109 169 | 5/1984 | European Pat. Off.. |
| 0 402 866 | 12/1990 | European Pat. Off.. |
| 0 475 708 | 3/1992 | European Pat. Off.. |
| 891945 | 3/1962 | United Kingdom. |

OTHER PUBLICATIONS

WPI Accession No. 85–220757/36, Derwent Publications Ltd. abstract (JP 60–142860 Jul. 29, 1985).

"Standard Test Methods for Pore Size Characteristics of Membrane Filters By Bubble Point and Mean Flow Pore Test", *American Society For Testing & Materials* F316–86 (Apr. 1986).

*Primary Examiner*—Ana Fortuna
*Attorney, Agent, or Firm*—Leydig, Voit & Mayer, Ltd.

[57] ABSTRACT

The present invention provides a polymeric, particularly aramid, fibrous nonwoven web having a relatively small pore size. The present inventive fibrous nonwoven web preferably has a high titer reduction with respect to bacteria such as *Pseudomonas diminuta* and viruses as exemplified by PR772 coliphage. The present invention further provides a method of filtering a fluid by passing a fluid through the present inventive fibrous nonwoven web, as well as a filter element incorporating the present inventive fibrous nonwoven web.

36 Claims, 1 Drawing Sheet

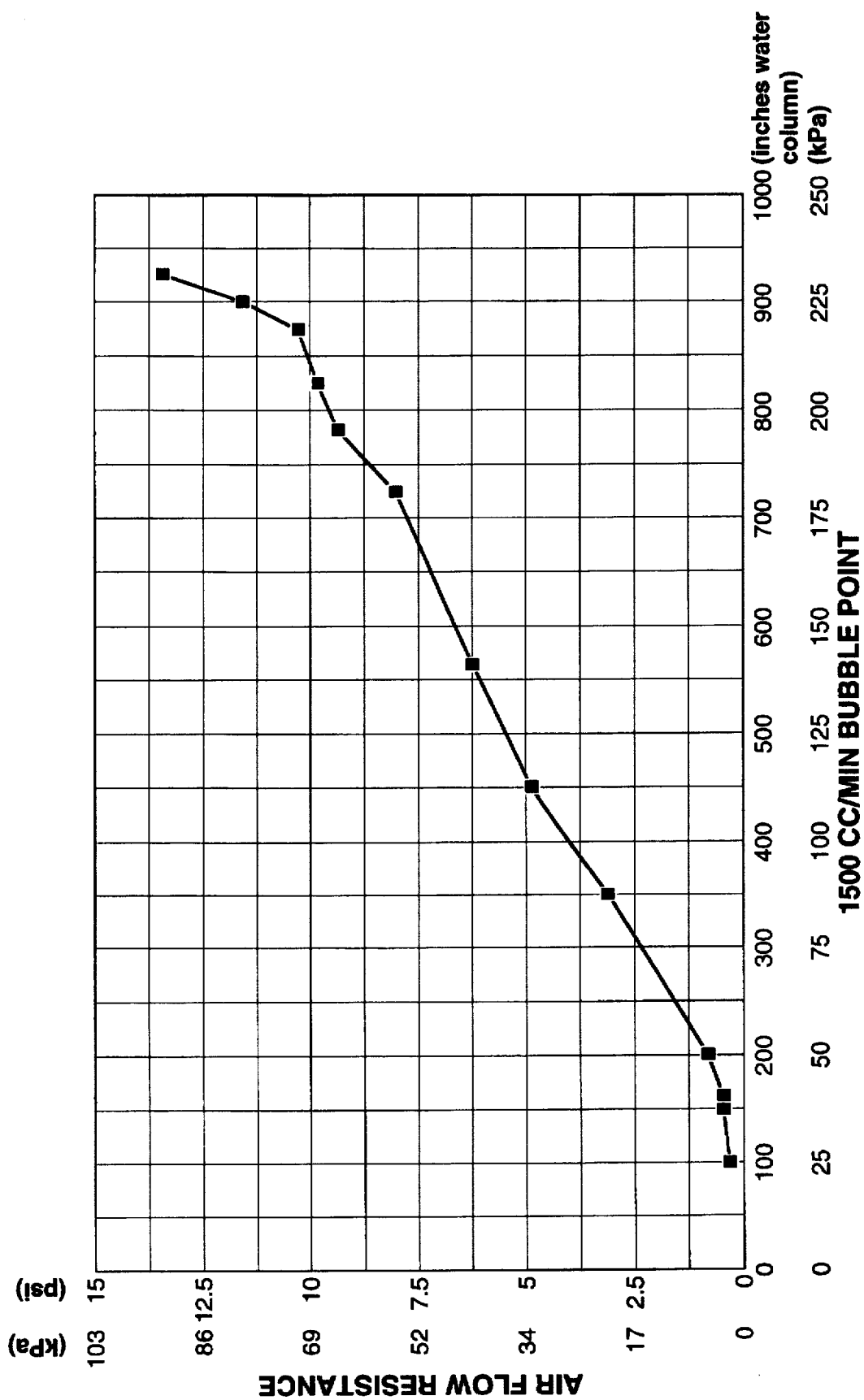

FIBROUS NONWOVEN WEB

TECHNICAL FIELD OF THE INVENTION

The present invention pertains to a fibrous nonwoven web. In particular, the present invention relates to a polymeric fiber sheet, especially an aramid fiber sheet, as well as a method of preparing and using such a sheet, particularly as a filtration medium.

BACKGROUND OF THE INVENTION

Numerous fibrous filtration sheets have been prepared from a variety of fibers, such as glass, polyethylene, polypropylene, polyester, and aramid fibers. While these sheets are suitable for many applications, particularly many filtration applications, they are generally incapable of reliably removing small micron and submicron particulate matter and bacteria and viruses. While the thickness of such a fibrous sheet can be increased to compensate for the relatively large pore size of the sheet, the flow resistance of the sheet then becomes impractically high. This inability to prepare fibrous filtration sheets of sufficiently small pore size is generally the result of the unavailability of fibers of sufficiently fine diameter inasmuch as the pore size of a fibrous filtration sheet is related to some extent to the fiber diameter used to prepare such a sheet, i.e., uniformly smaller diameter fibers will more easily allow for the preparation of a fibrous filtration sheet of uniformly smaller pore size.

While membranes, such as microporous and ultrafiltration membranes, are capable of providing the desirable smaller pore size as compared to fibrous nonwoven webs, membranes suffer from many performance disadvantages as compared to fibrous nonwoven webs. For example, membranes are relatively brittle and require considerable care in handling. As a result, membranes are difficult to convert into corrugated structures for filter elements without introducing cracks in the membranes, particularly in preparing small radii filter elements, with the consequent loss of filtration efficiency. The relative fragility of membranes also render membranes susceptible to failure upon pulsing of the fluid flow through the membranes.

Accordingly, there remains a need for a fibrous nonwoven web with a relatively small pore size, preferably sufficiently small to remove submicron particles, especially bacteria and viruses, at a reasonable thickness and/or flow resistance through the fibrous nonwoven web. Such a fibrous nonwoven web preferably would also have a high modulus, as well as sufficient elongation, so as to withstand filtration conditions, such as pulsing, which can be encountered in commercial filtration processes. The handling characteristics of such a fibrous nonwoven web should also be such that the fibrous nonwoven web can be converted into a corrugated structure for a filter element without damaging the web in any way so as to affect filtration efficiency. A high temperature resistance and good chemical stability are other useful and desirable characteristics of such a fibrous nonwoven web.

The present invention provides such a fibrous nonwoven web, as well as a method of preparing and of using such a fibrous nonwoven web, particularly in filtration applications. These and other objects and advantages of the present invention, as well as additional inventive features, will be apparent from the description of the invention provided herein.

BRIEF SUMMARY OF THE INVENTION

The present invention provides a fibrous nonwoven web useful as a filtration medium. The present inventive fibrous nonwoven web is characterized by having a titer reduction of at least about $10^6$, preferably at least about $10^8$, and most preferably at least about $10^{10}$, with respect to *Pseudomonas diminuta*, and a titer reduction of at least about $10^1$ preferably at least about $10^3$, more preferably at least about $10^5$, and most preferably at least about $10^8$, or even at least about $10^{10}$, with respect to PR772 coliphage, and an air flow resistance of about 30 psi (about 200 kPa) or less at a thickness of about 0.02 inch (about 500 μm) or less. Accordingly, the present inventive fibrous nonwoven web can be prepared so as to be capable of removing all bacteria and a significant portion of, and preferably all, viruses from a fluid. The present invention further provides a method of filtering a fluid by passing a fluid through the present inventive fibrous nonwoven web.

BRIEF DESCRIPTION OF THE DRAWING

FIG. 1 is a graph depicting a curve showing the relationship between the air flow resistance (psi and kPa) of fibrous nonwoven webs prepared in accordance with the present invention and the 1500 cc/min bubble points (in. water column and kPa) of the fibrous nonwoven webs.

DESCRIPTION OF THE PREFERRED EMBODIMENTS

The present invention provides a fibrous nonwoven web with the pore size, e.g., microporosity, advantages of a membrane and the handling advantages of a fibrous nonwoven web such as ruggedness, extended life, filter depth, and strength, with few of the disadvantages of either of those filtration media. While membranes, e.g., microporous and ultrafiltration membranes, can be prepared which are capable of having submicron pore ratings which could be used to exclude, for example, the smallest bacteria and viruses, such membranes suffer from the significant disadvantage of being quite fragile. In many situations requiring more rugged filtration media, fibrous nonwoven webs are utilized; however, such fibrous nonwoven webs are generally limited to the filtration of relatively larger particles from fluids and are not typically suitable for removing submicron particles such as bacteria and viruses from fluids. The present inventive fibrous nonwoven web provides a combination of the advantages of conventional membrane and fibrous nonwoven web filtration media.

In particular, the present invention provides a fibrous nonwoven web characterized by a titer reduction of at least about $10^6$, preferably at least about $10^8$, and most preferably at least about $10^{10}$, with respect to *Pseudomonas diminuta*. Since *Pseudomonas diminuta* is generally accepted as the smallest and highest penetrating test bacteria, its retention by a material is evidence of the material's ability to provide absolute removal of bacteria, particularly liquid-borne bacteria, in most applications. Thus, the present invention is generally capable of the absolute removal of bacteria from fluids under most conditions.

Similarly, the present inventive fibrous nonwoven web can be further characterized by a titer reduction of at least about $10^1$, preferably at least about $10^3$, more preferably at least about $10^5$, and most preferably at least about $10^8$, or even at least about $10^{10}$, with respect to PR772 coliphage. While viruses are not all of the same size, viruses are typically characterized as either "large" viruses or "small" viruses. The large viruses include viruses of about 0.08 μm in effective diameter and larger, e.g., adenoviruses, rheoviruses, and herpes viruses. The small viruses include viruses which are about 0.025–0.028 μm in effective diameter, e.g., hepatitis viruses, polio viruses, and parvoviruses. Inasmuch as the size of the PR772 coliphage is about 0.053 µm, and the size of the PP7 bacteriophage is about 0.027 µm, these phages provide excellent models for assessing the removal efficiency of a filtration medium with regard to various sized viruses. A filtration medium is generally considered to have an absolute removal ability with respect to a particular particle, e.g., the PR772 coliphage as representative of intermediate-sized viruses, when it has at least a $10^8$, and preferably at least a $10^{10}$, titer reduction with respect to that particle. Of course, an absolute removal ability of a filtration medium with respect to the PR772 or PP7 phages would confirm the absolute removal ability of that filtration medium with respect to larger viruses.

The titer reduction of a filtration medium with respect to a particular particle, e.g., PR772 coliphage, is the ratio of that particle contained in the influent to that contained in the effluent. Surprisingly, the aforesaid titer reduction is capable of being achieved by the present inventive fibrous nonwoven web at a reasonable thickness and flow resistance. In particular, the aforesaid titer reductions preferably can be achieved with the present inventive fibrous nonwoven web having a thickness of about 0.02 inch (about 500 µm) or less, more preferably a thickness of about 0.01 inch (about 250 µm) or less, and most preferably a thickness of about 0.008 inch (about 200 µm) or less, e.g., about 0.001–0.006 inch (about 25–150 µm). The present inventive fibrous nonwoven web desirably has an air flow resistance of about 30 psi (about 200 kPa) or less, preferably about 20 psi (about 140 kPa) or less, more preferably about 15 psi (about 100 kPa) or less, and most preferably about 7 psi (about 50 kPa) or less, e.g., about 1.5–6 psi (about 10–40 kPa). All of the air flow resistance (i.e., pressure drop or ΔP) values set forth herein to describe and illustrate the present invention reflect values determined using an air flow rate of 28 ft/min (about 8.5 m/min) in accordance with the general procedure described in U.S. Pat. No. 4,340,479.

The present inventive fibrous nonwoven web can have any suitable sheet (or basis) weight. The desirable sheet weight of the present inventive fibrous nonwoven web will vary depending on the particular application for the fibrous nonwoven web. In many applications, the present inventive fibrous nonwoven web will generally have a sheet weight no more than about 80 g/m$^2$ and will desirably have a sheet weight of no more than about 60 g/m$^2$, preferably no more than about 40 g/m$^2$. While the present inventive fibrous nonwoven web can have a sheet weight of less than about 10 g/m$^2$, such a filtration fibrous nonwoven web will typically have a sheet weight of at least about 20 g/m$^2$, e.g., 20–40 g/m$^2$.

Generally, the present inventive fibrous nonwoven web will have as low a sheet weight as possible as consistent with application objectives. A lower sheet weight will typically result in a lower flow resistance and a thinner fibrous nonwoven web, which in turn reduces material costs and enables the easier manipulation of the fibrous nonwoven web, particularly the easier corrugation of the fibrous nonwoven web without damage for use in a filter cartridge. Further, this will provide higher filter surface area with respect to a particular volume and longer service life. Surprisingly, the desirable properties of the present inventive fibrous nonwoven web, including consistent and predictable removal efficiencies, are attainable at very low sheet weights, e.g., to as low as 20 g/m$^2$ and below.

The present invention also provides a method of preparing the fibers which are useful in the construction of the present inventive fibrous nonwoven web. Specifically, the present invention includes a method of reducing the diameter, and preferably length, of fibers comprising preparing a dispersion of fibers in a fluid and subjecting the dispersion to fibrillation, particularly mechanical fibrillation, under conditions sufficient to reduce the average diameter, and preferably length, of the fibers. The present invention also includes a method of preparing a fibrous nonwoven web comprising reducing the diameter, and preferably length, of fibers as described herein and preparing a fibrous nonwoven web from the thus processed fibers.

Such fibers can include any suitable fibers, preferably polymeric fibers, such as aramid, titinate, and asbestos fibers. While the present inventive fibrous nonwoven web can comprise any of such fibers or combinations thereof, with or without other fibers, e.g., glass fibers, or other materials, the present inventive fibrous nonwoven web preferably consists essentially of such fibers alone. Such fibers most preferably are aramid fibers, which are fibers of poly(paraphenylene terephthalamide) and related compounds wherein the majority of the amide groups are directly attached to two aromatic rings. Aramid fibers are commercially available as Kevlar® fibers (DuPont, Wilmington, Del.), Twaron® fibers (Akzo, Arnhem, Netherlands), Apyeil® fibers (Unitika, Osaka, Japan), and Conex® fibers (Teijin, Osaka, Japan). While any suitable aramid fibers may be used in conjunction with the present invention, Kevlar® 361 and Twaron® 1094 aramid fibers are preferably utilized for purposes of the present invention.

The fibers useful in the context of the present invention may be of any suitable length and will typically be cut fibers of about 4 mm or less in length. In general, shorter length fibers, such as fibers having lengths of about 2 mm or less, are desirably used in connection with the present invention. The use of shorter length fibers can result in a decrease or avoidance of undesirable entanglements during the preparation of the present inventive fibrous nonwoven web and can lead to the preparation of a thinner and more uniform fibrous nonwoven web with reduced flow resistance while retaining the desirable properties of the present inventive fibrous nonwoven web.

The reduction of the diameter of the fibers may be carried out by subjecting any suitable dispersion of the fibers, e.g., aqueous dispersions of about 50 g/l or less, to any suitable fibrillation means under conditions sufficient to reduce the average diameter of the fibers. It has been discovered that more concentrated fiber dispersions can be beneficial in achieving greater fibrillation, i.e., greater diameter reduction, of the fibers. Thus, the fibrillation in the context of the present invention is preferably carried out with fiber dispersions of at least about 20 g/l, e.g., about 25–40 g/l. Such fibrillation can be carried out by any suitable device, such as a mill mixer, particularly a Kady Mill® mixer (Kinetic Dispersion Corp., Scarborough, Ma.), for a sufficient period of time, a homogenizer, particularly a Union® HTD28 Homogenizer (Union Pump Co., North Andover, Mass.), for a sufficient number of passes, or a microfluidizer, particularly a Microfluidizer Model M110Y or M110EH (Microfluidics International Corp., Newton, Mass.), for a sufficient number of passes.

It has been found that the processing time in conjunction with the fibers solids and fibrillation energy, e.g., mechanical energy, is directly related to the filtration efficiency of the resulting fibrous nonwoven web prepared from the processed fibers. Thus, for example, it is possible to provide a fibrous nonwoven web with a consistent and predictable titer reduction by controlling the processing time of the fibers in a given piece of equipment under constant operating conditions.

The use of a mill mixer to treat fibers in the context of the present invention is preferred inasmuch as such equipment provides for fibers with smaller diameters and, thus, fibrous nonwoven webs with smaller pores. Such equipment is preferably operated at maximum recommended operating conditions to achieve the smallest diameter fibers and smallest pore rated fibrous nonwoven webs in the least amount of processing time.

The mechanical fibrillation in the context of the present invention is quite different than the mixing which typically takes place in conventional Fourdrinier paper making processes which utilize relatively low-energy beaters such as the Jordan®, Cowles®, and Claflin® beaters. Such relatively low-energy mixers, however, may be used to prepare an initial dispersion of the raw fibers prior to subjecting the dispersion to the mechanical fibrillation in accordance with the present invention. For example, a raw fiber dispersion may be prepared by such a relatively low-energy beater until a satisfactory dispersion is reached, e.g., no lumps are readily apparent in the dispersion, which point will be typically reached within an hour or two. This dispersion may then be diluted as desired before being subjected to the fibrillation process in accordance with the present invention as described above. The present invention accordingly provides fiber which is capable of being formed into the present inventive fibrous nonwoven web.

Surprisingly, the present invention is capable of reducing the diameter of fibers without substantially adversely affecting other, desirable characteristics of the fibers, including the modulus, elongation, temperature resistance, and chemical stability of such fibers. Thus, fibrous nonwoven webs prepared from the thus processed fibers retain the desirable properties of conventional fibrous nonwoven webs while also exhibiting improved pore size and pore size distribution characteristics akin to those of membranes.

The present inventive fibrous nonwoven web can be prepared from such processed fibers by fibrous sheet techniques which are well-known in the art, such as conventionally modified Fourdrinier paper making processes. While a binder resin is generally not necessary to provide structural integrity to the fibrous nonwoven web (surprisingly, it is believed that the fibers' natural surface charge holds the fibers together), a binder resin can nevertheless be used in preparing the present inventive fibrous nonwoven web so as to improve the mechanical properties, particularly the tensile properties, of the fibrous nonwoven web. Any suitable binder resin can be utilized in the context of the present invention. Suitable binder resins include epoxy binders, binders which would impart a positive zeta potential to the fibrous nonwoven web, acrylic binders, tetrafluoroethylene binders, and fluoroethylene polymer binders. The binder resin can be utilized with the present inventive fibrous nonwoven web by use of a variety of techniques, which are well-known in the art. For example, the fibrous nonwoven web can be passed through an appropriate resin solution, dried, and then cured. Alternatively, an appropriate binder resin can be exhausted onto the fibers in slurry form preparatory to a Fourdrinier operation to convert the fibrous slurry into a fibrous nonwoven web. Additional methods of binder application include spraying, pattern printing, and powder resin coating.

The present inventive fibrous nonwoven web can be surface modified to, for example, impart a charge (e.g., a positive zeta potential) to the fibrous nonwoven web or to modify the critical wetting surface tension (CWST) of the fibrous nonwoven web (e.g., to render it hydrophobic, hydrophilic, oleophobic, or oleophilic). The measurement of CWST is disclosed in U.S. Pat. No. 4,880,548. Such surface modification of the present inventive fibrous nonwoven web can be carried out in any suitable manner and is preferably accomplished by graft polymerizing a suitable monomer onto the surface of the fibrous nonwoven web. Preferred examples of such monomers include acrylic or methacrylic monomers having alcohol functional groups, such as, for example, hydroxyethylacrylate, hydroxyethylmethacrylate, hydroxypropylacrylate, hydroxypropylmethacrylate, and combinations thereof, particularly hydroxypropylacrylate and/or hydroxyethylmethacrylate. These monomers can be combined with small amounts of acrylic monomers having no alcohol functional groups, such as methyl methacrylate, as described in U.S. Pat. No. 5,019,260.

Any suitable means may be used to polymerize the suitable monomers onto the fibrous nonwoven web of the present invention. Radiation grafting is the preferred technique to achieve such a result. The source of radiation can be from radioactive isotopes like Cobalt 60, Strontium 90, and Cesium 137, or from machines like x-ray machines, electron accelerators, and ultraviolet equipment. Preferably, however, the radiation is in the form of electron beam radiation. It has been found that, by using this form of radiation, a very uniform distribution of radiation can be provided. This in turn results in a final product which is grafted more uniformly as compared to those fibrous nonwoven webs which are grafted using other radiation sources, e.g., Cobalt 60.

Grafting will typically be achieved by either irradiating the fibrous nonwoven web and then exposing it to a suitable solution of the monomer or irradiating the fibrous nonwoven web while it is exposed to a suitable solution of the monomer. Regardless of which procedure is used, the grafting should be conducted in the absence of oxygen, e.g., under a nitrogen atmosphere, since oxygen will react with the reactive sites created by radiation exposure, thereby lowering the number of sites available for the desired polymer bonding. If the fibrous nonwoven web is irradiated prior to immersion in the monomer solution, the fibrous nonwoven web should contact the monomer solution as quickly as possible to avoid undesirable reactions resulting in the loss of reactive sites for bonding the polymer to the surface of the fibrous nonwoven web.

The monomer solution can comprise any suitable concentration of the monomer to be graft polymerized, typically 1–10 vol. % monomer in a solvent system, generally water by itself or with a suitable alcohol such as t-butyl alcohol. The graft polymerization can be carried out in the presence or absence of crosslinking agents, although crosslinking agents are preferably used when the aforementioned acrylate monomers are graft polymerized onto the surface of the fibrous nonwoven web. Any suitable crosslinking agent can be used in the context of the present invention. Suitable crosslinking agents include di- or poly-acrylates and methacrylates of diols and polyols, particularly linear or branched aliphatic diols such as ethylene glycol, 1,2-propylene glycol, diethylene glycol, dipropylene glycol, dipentylene glycol, polyethylene glycol, polypropylene glycol, polytetramethylene-oxide glycol, and poly(ethylene oxide-copropylene-oxide)glycol, as well as triol acrylates such as trimethylolpropane triacrylate. The crosslinking agent can be utilized in any suitable amount. Typically, the crosslinking agent will be added to the grafting solution in an amount of about 0.025 vol. % to about 5 vol. %, more typically in an amount of about 0.05 vol. % to about 2 vol. %. The details and parameters of polymer grafting are well known in the art.

While the present inventive fibrous nonwoven web is inherently self-supporting at appropriate basis weight, the present inventive fibrous nonwoven web is preferably mated to a suitable support material, e.g., conventional low pressure drop, high strength support layer, particularly when the present inventive fibrous nonwoven web is prepared without added binder resin. The support layer can comprise any suitable porous structure that provides the desired support characteristics while not adversely affecting the desirable properties of the present inventive fibrous nonwoven web, e.g., does not significantly adversely affect flow resistance ($\Delta P$). Suitable materials for the support layer include polymers such as aramid, polyester, polyethylene, polypropylene, and polyamide, as well as glass and cotton. Ideally, the support layer should be compatible with the particular environment, e.g., fluid and operating conditions, within which the present inventive fibrous nonwoven web is intended to operate. Thus, the support layer can be of the same composition as the fibrous nonwoven web, although polyester is generally a desirable support material irrespective of the composition of the fibrous nonwoven web. The present invention further provides a method of treating, e.g., filtering, a fluid by passing a fluid through the present inventive fibrous nonwoven web. In particular, the filtration of a fluid by passing it through the present inventive fibrous nonwoven web can reduce the quantity of bacteria and preferably viruses in the fluid. Thus, the present inventive filtration method includes passing a fluid through the present inventive fibrous nonwoven web, which fluid contains bacteria, e.g., more than about $10^6$/ml, and even more than about $10^8$/ml, and possibly as much as $10^{10}$/ml or more, before being passed through the fibrous nonwoven web and contains no bacteria after being passed through the fibrous nonwoven web. More preferably, the present inventive method involves passing a fluid through the present inventive fibrous nonwoven web, which fluid contains at least about $10^4$/ml, possibly at least about $10^6$/ml, $10^8$/ml, or even $10^{10}$/ml, viruses before being passed through said fibrous nonwoven web and contains less than about $10^2$/ml viruses after being passed through the fibrous nonwoven web, most preferably wherein the fluid contains no viruses after being passed through the fibrous nonwoven web.

Thus, the present inventive fibrous nonwoven web is particularly useful in the filtration of fluids to remove bacteria and reduce, if not totally remove, many viruses therefrom, depending upon the particular application and the configuration of the present inventive fibrous nonwoven web. The present inventive fibrous nonwoven web can be used to filter any such fluids, such as pharmacological and biotechnology process fluids. The excellent removal and handling characteristics of the present inventive fibrous nonwoven web, as compared to many other fibrous nonwoven web and membrane filtration media, also render the present inventive fibrous nonwoven web suitable for a variety of other filtration applications, including most applications in which less effective fibrous nonwoven webs are currently being used, as well as in many applications in which membranes are being used and have been considered for use. Exemplary uses of the present inventive fibrous nonwoven web include such applications as a prefilter coalescer for fuel (particularly aircraft fuel, e.g., JP100 fuel), a filter to remove colloidal level iron oxide (which would rapidly plug an equivalent pore rated membrane), and a filter pad for filter presses.

The present inventive fibrous nonwoven web is also useful in a wide variety of other applications. For example, the present inventive fibrous nonwoven web can be utilized in "breathable" protective garments suitable for use in adverse environments such as biological and toxic atmospheres (especially when treated with a fluoropolymer, e.g., polytetrafluoroethylene, repellant or other suitable coating). Moreover, since aramids are flame/heat-resistant and radiation tolerant, with some chemical resistance, the present inventive fibrous nonwoven web, at least when prepared from aramid fibers, can be used in high temperature and/or radiation environments.

The fibrous nonwoven web of the present invention can be formed into any suitable configuration. The present inventive polymeric fibrous nonwoven web can be used in suitable filters, filtration cartridges, and the like. The present inventive fibrous nonwoven web can be used in dead-end filtration applications, as well as in tangential, cross-flow, and dynamic filtration applications.

The present inventive fibrous nonwoven web is expected to be especially useful in filter elements, such as filter cartridges, which are generally described in U.S. Pat. No. 4,340,479. Preferred filter elements utilizing the present inventive fibrous nonwoven web comprise the present inventive fibrous nonwoven web, wherein the sides of the fibrous nonwoven web have been overlapped and sealed to form a tubular configuration having an exterior surface, an interior, and two ends, and end caps sealed to the ends of the tube, wherein at least one of the end caps has a central aperture providing access to the interior of the tube, and all of the seals are fluid-tight. The present inventive fibrous nonwoven web is preferably corrugated or pleated in such a filter element so as to provide a large surface area for the volume of the filter element. At least one of the sides of the fibrous nonwoven web can be mated to a porous support layer, and, in such a situation, the fibrous nonwoven web and porous support layer will generally both be corrugated. The filter element can comprise a single fibrous nonwoven web of the present invention or, more preferably, multiple such fibrous nonwoven webs mated together. When there are multiple fibrous nonwoven webs in the filter element, the fibrous nonwoven webs can be separated by a porous support layer to which each fibrous nonwoven web is mated, or, when there are two fibrous nonwoven webs, the fibrous nonwoven webs can be positioned such that there is no porous support layer therebetween. The other aspects of the filter element may be of any suitable construction and prepared from any suitable material. For example, the end caps can be prepared from a suitable thermoplastic material, such as polyolefin, polyamide, and polyester, particularly, polybutylene glycol terephthalate or polyethylene glycol terephthalate. The filter element can be constructed using techniques which are well-known in the art.

The present inventive fibrous nonwoven web is expected to be also useful in helically wrapped filter elements, such as filter septa. Such filter elements are generally described in U.S. Pat. No. 5,290,446. Helically wrapped filter elements in accordance with the present invention will typically comprise the present inventive fibrous nonwoven web which is helically wrapped around a pervious, hollow tube to form an overlap of 0% to about 95% of the width of the fibrous nonwoven web. There may be one or more such helically wrapped fibrous nonwoven webs, and there is preferably at least one diffusion layer which allows for lateral flow of fluid within the filter element positioned between the fibrous nonwoven web and the pervious, hollow tube and/or between successive fibrous nonwoven webs.

The following examples further illustrate the present invention and, of course, should not be construed as in any way limiting its scope.

EXAMPLE 1

This example illustrates the fine pore structure in combination with a relatively low air flow resistance which can be a characteristic of the fibrous nonwoven web of present invention.

A series of fibrous nonwoven webs was prepared by conventional fibrous sheet techniques from an aqueous slurry of 25 g/l aramid fiber which was subjected to mechanical fibrillation for various times up to about 145 hr using a mill mixer in an open tank system with 6 inch (about 15 cm) diameter rotor having angular slots against a similarly slotted stator with 0.005–0.008 inch (about 127–203 μm) clearance. While not intending to bound to any particular theory, it is believed that the aramid fiber slurry concentration was such that the rotor-stator clearance effectively simulated zero or a negative clearance.

The resulting fibrous nonwoven webs had thicknesses of about 0.01 inch (about 254 μm). The air flow resistance at 28 ft/min (about 8.5 m/min) and 1500 cc/min bubble point (ASTM F316–86) was determined for each of the fibrous nonwoven webs. The 1500 cc/min bubble point is the applied pressure resulting in the passage of 1500 cc/min of air through the sheet which is alcohol wet (specifically with isopropyl alcohol), i.e., general air flow through the sheet indicating the expulsion of substantially all the alcohol wetting liquid from the pores of the sheet. The observed air flow resistance and 1500 cc/min bubble point values are set forth in FIG. 1, which is a graph of air flow resistance versus 1500 cc/min bubble point for the fibrous nonwoven webs.

The 1500 cc/min bubble point is an indication of the pore size of the fibrous nonwoven sheet, with the higher bubble points indicative of the smaller pore sizes achievable with increasing processing time of the aramid fiber in the mill mixer. As is apparent from the graph of FIG. 1, the present inventive fibrous nonwoven web can be characterized by a relatively high 1500 cc/min bubble point, e.g., about 800 inches water column (about 200 kPa) or more, with a reasonable air flow resistance, e.g., about 10–15 psi (about 69–103 kPa).

EXAMPLE 2

This example illustrates the excellent titer reduction with respect to viruses of a fibrous nonwoven web of the present invention.

A fibrous nonwoven web was prepared in the manner described in Example 1. The fibrous nonwoven web had a thickness of about 0.01 inch (about 254 μm) and possessed an air flow resistance at 28 ft/min (about 8.5 m/min) of about 12 psi (about 83 kPa) and a 1500 cc/min bubble point (ASTM F316–86) of about 900 inches water column (about 225 kPa).

Two 142 mm diameter disc samples of the fibrous nonwoven web were subjected to a challenge fluid comprising 0.2 μm filtered Tryptin soy broth containing $1.6 \times 10^8$/ml PR772 coliphage. The challenge was run via a pressure vessel at 100–200 ml/min, with a total of 500 ml effluent being collected for each test disc. The effluent was then tested to determine the titer reduction achieved by each disc.

The two disc samples were found to have titer reductions with respect to PR772 coliphage of $4.6 \times 10^3$ and $5.0 \times 10^3$, respectively.

EXAMPLE 3

This example further illustrates the excellent titer reduction with respect to viruses of a fibrous nonwoven web of the present invention.

The fibrous nonwoven web of Example 2 was subjected to the same viral titer reduction testing set forth in Example 2, except that the challenge fluid contained $1.5 \times 10^8$/ml PR772 coliphage and two layers of the fibrous nonwoven web were used in each of two tests. Thus, the thickness of the tested disc samples was about 0.020 inch (about 508 μm), with a total air flow resistance at 28 ft/min (about 8.5 m/min) of about 24 psi (about 166 kPa).

Each of the two disc samples were found to have titer reductions with respect to PR772 coliphage of $>1.5 \times 10^8$. Thus, the present inventive fibrous nonwoven web removed all of the PR772 coliphage from the challenge fluid.

All of the references cited herein, including publications and patents, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A fibrous nonwoven web characterized by having a titer reduction of at least about $10^1$ with respect to PR772 coliphage and an air flow resistance of about 30 psi or less at a thickness of about 0.01 inch or less.

2. The fibrous nonwoven web of claim 1, wherein said fibrous nonwoven web comprises aramid fibers.

3. The fibrous nonwoven web of claim 2 having a titer reduction of at least about $10^3$ with respect to PR772 colipage at a thickness of about 0.01 inch or less.

4. The fibrous nonwoven web of claim 3 having a titer reduction of at least about $10^5$ with respect to PR772 coliphage at a thickness of about 0.01 inch or less.

5. The fibrous nonwoven web of claim 4 having a titer reduction of at least about $10^8$ with respect to PR772 coliphage at a thickness of about 0.01 inch or less.

6. The fibrous nonwoven web of claim 5, wherein said fibrous nonwoven web has a sheet weight of about 80 g/m² or less.

7. The fibrous nonwoven web of claim 6, wherein said fibrous nonwoven web has an air flow resistance of about 15 psi or less at a thickness of about 0.01 inch or less.

8. The fibrous nonwoven web of claim 1, wherein said fibrous nonwoven web has a surface coating of a polymer thereon.

9. The fibrous nonwoven web of claim 8, wherein said polymer has a positive zeta potential.

10. The fibrous nonwoven web of claim 8, wherein said polymer is hydrophilic.

11. The fibrous nonwoven web of claim 8, wherein said polymer is hydrophobic.

12. The fibrous nonwoven web of claim 1, wherein said fibrous nonwoven web includes a binder resin.

13. The fibrous nonwoven web of claim 12, wherein said binder resin is a fluoropolymer.

14. The fibrous nonwoven web of claim 13, wherein said binder resin is polytetrafluoroethylene.

15. A method of filtering a fluid comprising passing a fluid through the fibrous nonwoven web of claim 1.

16. The method of claim 15, wherein said fluid contains bacteria before being passed through said fibrous nonwoven web and contains no bacteria after being passed through said fibrous nonwoven web.

17. The method of claim 15, wherein said fluid contains at least about $10^4$/ml viruses before being passed through said fibrous nonwoven web and contains less than about $10^2$/ml viruses after being passed through said fibrous nonwoven web.

18. The method of claim 17, wherein said fluid contains no viruses after being passed through said fibrous nonwoven web.

19. A filter element comprising a housing and the fibrous nonwoven web of claim 1.

20. A fibrous nonwoven web characterized by having a titer reduction of at least about $10^5$ with respect to PR772 coliphage and an air flow resistance of about 30 psi or less at a thickness of about 0.02 inch or less.

21. The fibrous nonwoven web of claim 20, wherein said fibrous nonwoven web comprises aramid fibers.

22. The fibrous nonwoven web of claim 21, having a titer reduction of at least about $10^8$ with respect to PR772 coliphage at a thickness of about 0.02 inch or less.

23. The fibrous nonwoven web of claim 22, wherein said fibrous nonwoven web has a sheet weight of about 80 g/m$^2$ or less.

24. The fibrous nonwoven web of claim 23, wherein said fibrous nonwoven web has an air flow resistance of about 15 psi or less at a thickness of about 0.02 inch or less.

25. The fibrous nonwoven web of claim 20, wherein said fibrous nonwoven web has a surface coating of a polymer thereon.

26. The fibrous nonwoven web of claim 25, wherein said polymer has a positive zeta potential.

27. The fibrous nonwoven web of claim 25, wherein said polymer is hydrophilic.

28. The fibrous nonwoven web of claim 25, wherein said polymer is hydrophobic.

29. The fibrous nonwoven web of claim 20, wherein said fibrous nonwoven web includes a binder resin.

30. The fibrous nonwoven web of claim 29, wherein said binder resin is a fluoropolymer.

31. The fibrous nonwoven web of claim 30, wherein said binder resin is polytetrafluoroethylene.

32. A method of filtering a fluid comprising passing a fluid through the fibrous nonwoven web of claim 20.

33. The method of claim 32, wherein said fluid contains bacteria before being passed through said fibrous nonwoven web and contains no bacteria after being passed through said fibrous nonwoven web.

34. The method of claim 32, wherein said fluid contains at least about $10^4$/ml viruses before being passed through said fibrous nonwoven web and contains less than about $10^2$/ml viruses after being passed through said fibrous nonwoven web.

35. The method of claim 34, wherein said fluid contains no viruses after being passed through said fibrous nonwoven web.

36. A filter element comprising a housing and the fibrous nonwoven web of claim 20.

\* \* \* \* \*